Sept. 6, 1960          H. KRETZSCHMAR          2,951,743
PROCESS OF MAKING ALUMINA
Filed March 26, 1957
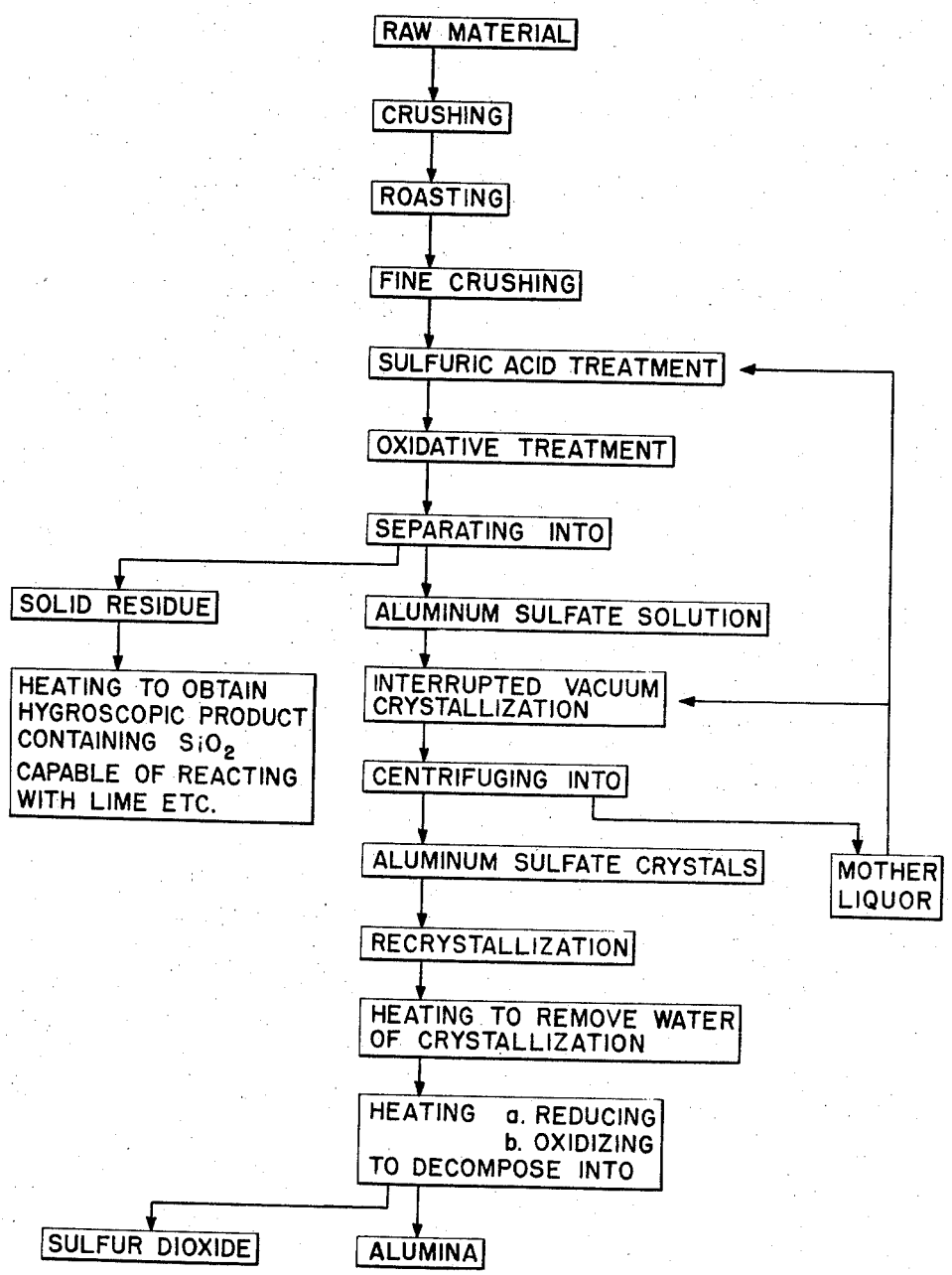
INVENTOR.
Hermann Kretzschmar
BY
Michael S. Striker
Attorney

United States Patent Office 2,951,743
Patented Sept. 6, 1960

2,951,743

PROCESS OF MAKING ALUMINA

Hermann Kretzschmar, Berlin-Charlottenburg, Germany, assignor to Vereinigte Aluminium-Werke Aktiengesellschaft, Bonn, Germany Filed Mar. 26, 1957, Ser. No. 648,667

Claims priority, application Germany Mar. 29, 1956

8 Claims. (Cl. 23—143)

The present invention relates to a process of making alumina, and more particularly it relates to a process of making alumina of high purity in which all of the raw material is converted to useful products.

In the production of aluminum salts and pure alumina from raw materials containing silicic acid and alumina, such as bauxite or clay, a considerable quantity of a residue is obtained which generally constitutes a worthless waste product. This is equally the case whether the decomposition of the raw material is carried out by an alkaline or by an acidic process. In case of alkaline decomposition of raw materials, particularly of raw materials relatively poor in silicic acid content, this unusable residue is tolerable without upsetting the economics and jeopardizing the profitability of the process. However, in the case of acidic decomposition of raw materials which is particularly indicated with raw materials of relatively high silicic acid content, the residue poses a serious problem. The economic feasibility of the acidic alumina process is a questionable one unless the residue obtained thereby can be put to a useful purpose. For this reason alumina has been produced during the last decades primarily, practically exclusively, by an alkaline decomposition process. This could be done as long as sufficient quantities of raw materials relatively poor in silicic acid content were available. In view of the increasing demand of the aluminum industry for pure alumina, it is becoming more and more difficult to obtain sufficient quantities of raw materials yielding alumina by an alkaline decomposition process, and consequently there is an urgent need for an economically feasible decomposition process suitable for raw materials of relatively high silicic acid content. In view of the composition of such raw materials, the process would have to be an acidic decomposition process, and in order to be economically feasible, such process must include full utilization of the residue accruing thereby.

It is therefore an object of the present invention to overcome the disadvantages and difficulties in the production of alumina from raw materials containing silicic acid and alumina, and particularly from raw materials containing relatively large quantities of silicic acid.

It is another object of the present invention to provide an acidic decomposition process for the production of alumina which process can be carried out in an economical and relatively simple manner.

It is a further object of the present invention to provide a process for producing alumina from raw materials containing the same and also containing silicic acid, whereby not only alumina of high purity is produced, but also full commercial utilization of waste by-products is achieved.

Other objects and advantages of the present invention will become apparent from a further reading of the description and the appended claims.

With the above and other objects in view, the present invention mainly comprises in a process of making alumina, the steps of decomposing with sulfuric acid a raw material containing silicic acid and alumina so as to transform said raw material into a solution of aluminum sulfate in the sulfuric acid and into a solid silicic acid-containing residue, separating the solid residue from the aluminum sulfate solution, subjecting the aluminum sulfate solution to interrupted vacuum crystallization so as to obtain water of crystallization-containing aluminum sulfate crystals of high purity and a mother liquor, separating the aluminum sulfate crystals from the mother liquor, and heating the aluminum sulfate crystals at a temperature and for a period of time sufficient to decompose the crystals into sulfur oxides and alumina, whereby an alumina of high purity suitable for electrolytic production of aluminum and sulfur oxides suitable for reconversion into sulfuric acid are obtained.

According to a preferred manner of carrying out the method of the present inveniton, the same comprises in a process of making alumina, the steps of roasting a raw material containing silicic acid and alumina at a temperature and for a period of time sufficient to transform a portion of the alumina in the raw material into a state in which the portion is soluble in diluted sulfuric acid so that approximately 70% of the alumina in the thus roasted raw material is soluble in diluted sulfuric acid, treating the thus roasted raw material with diluted sulfuric acid so as to transform the raw material into a solution of aluminum sulfate in the sulfuric acid and into a solid silicic acid-containing residue, separating the solid residue from the aluminum sulfate solution, subjecting in an evaporator the aluminum sulfate solution to partial evaporation under vacuum until aluminum sulfate crystal formation starts, introducing an additional quantity of aluminum sulfate solution into the evaporator so as to interrupt aluminum crystal formation therein, continuing to subject the aluminum sulfate solution in the evaporator to partial evaporation under vacuum until crystal formation is resumed and the thus formed crystals of aluminum sulfate have grown to a size adapted to be separated from the mother liquor by centrifuging, so as to obtain a mixture of water of crystallization-containing aluminum sulfate crystals of high purity and mother liquor, centrifuging the mixture so as to separate the aluminum sulfate crystals from the mother liquor, removing the water of crystallization from the aluminum sulfate crystals, heating in a rotary furnace the thus treated aluminum sulfate crystals at a temperature of between about 750 and 850° C. and under reducing conditions so as to decompose at least the major portion of the aluminum sulfate crystals into sulfur dioxide and alumina, and continuing said heating under oxidizing conditions for a relatively short period of time and until substantially all of the aluminum sulfate crystals have been decomposed into sulfur dioxide and alumina, the oxidizing conditions being so adjusted that the sulfur-dioxide-containing gases leaving the furnace have a free oxygen content of less than 1%, whereby an alumina of high purity suitable for electrolytic production of aluminum and sulfur dioxide suitable for reconversion into sulfuric acid are obtained.

While it is known that various clays, i.e. alumina silicates, can be made capable of being decomposed by strong mineral acids such as nitric acid, sulfuric acid or hydrochloric acid, by being heated or roasted within a certain range of elevated temperatures, so that it is possible to separate molecular silicic acid from molecular alumina and to obtain the alumina in such a state that the same can be attacked and reacted with the acid, it was not possible in this manner to obtain a sufficiently pure solution of aluminum sulfate. Upon crystallizing aluminum sulfate from such solution impurities were retained in the crystals so that it was not possible to further process these impure aluminum sulfate crystals to alumina of sufficiently high purity to be suitable for the electrolytic production of metallic aluminum. Aluminum sulfate produced as described in this paragraph can only be used for purposes requiring a lesser degree of purity, for instance in the paper industry and for water purification.

Surprisingly it has been found that impurities which are dissolved together with the aluminum sulfate such as iron sulfate, and which could not be completely removed by precipitation, will be separated from aluminum sulfate during crystallization of the same if such crystallization is carried out, according to the present invention, as an interrupted vacuum crystallization, as will be explained in detail further below.

During the customary decomposition of aluminum sulfate crystals at the conventional decomposition temperature of between 1100° and 1300° C., most of the sulfate is driven off in gaseous form, however, thereby is also formed a portion of basic sulfates, the sulfur of which adheres so firmly to the aluminum oxide that it can no longer be eliminated by heating to glow temperature. This residual sulfur impedes the further processing to metallic aluminum, and furthermore, increases the costs of the process due to the necessity of replacing the portion of the sulfur which is not driven off and thus cannot be re-utilized. It has now been found according to the present invention that pure aluminum sulfate can be decomposed at considerably lower temperatures, namely preferably at temperatures of between 750 and 850° C., in such a manner that the entire sulfur is separated and driven off from the thus formed alumina. In order to thus completely remove sulfur from the alumina and to obtain the thus removed sulfur in the form of sulfur oxides which easily can be reconverted into sulfuric acid and thus re-used for the decomposition of subsequent portions of raw material, it is advantageous, according to the present invention, to drive off the major portion of the sulfur under reducing conditions, i.e. so that free oxygen will be substantially completely bound and to complete the driving off of sulfur under oxidizing conditions so as to assure complete removal of the sulfur.

Thus, the present invention contemplates a particular method of crystallizing aluminum sulfate and a particular method of decomposing the aluminum sulfate so that the thus formed alumina will be free of sulfur and the entire sulfur content of the aluminum sulfate will be recovered.

In addition thereto, the present invention also provides for a treatment of the residue containing the silicic acid of the raw material so that the residue will be transformed into a valuable building material, particularly a binding agent or cementing material. This is achieved by heating the solid residue of the sulfuric acid decomposition of the raw material at a temperature and for a period of time sufficient to transform the larger portion of the silicic acid in the residue into a state wherein the silicic acid is capable of forming with lime and water a calcium hydrosilicate.

Furthermore, it is also within the scope of the present invention to re-use the mother liquor obtained in the interrupted vacuum crystallization of aluminum sulfate, which mother liquor is of relatively high purity due to the preceding process steps and contains of course considerable quantities of dissolved aluminum sulfate, by recycling the mother liquor so that the same enters the process of the present invention again, either during the decomposition of the raw material with sulfuric acid (i.e. as a diluent for the sulfuric acid) or during the vacuum crystallization step so as to cause interruption of crystallization, as will be explained in detail further below.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the single figure shows a flow sheet of the process of the present invention.

Referring first to the drawing in a general manner, it can be seen that the alumina is dissolved out of the raw material by means of sulfuric acid so as to form aluminum sulfate dissolved in the diluted sulfuric acid. The aluminum sulfate is then precipitated by interrupted vacuum crystallization. Throughout the present specification "interrupted crystallization" is meant to denote a crystallization process in which the concentration of the solution after the same has reached the saturation point and crystallization has started, is temporarily reduced by the addition of aluminum sulfate solution having a concentration below the saturation point of aluminum sulfate in the solution, and subsequent increasing of the concentration so as to again reach the saturation point whereby the interrupted crystallization of the aluminum sulfate is resumed.

The thus obtained crystallized pure aluminum sulfate (being of particularly high purity due to the exclusion of impurities by the above-described interrupted vacuum crystallization process) is then decomposed in a special manner, whereby the water of crystallization of the aluminum sulfate crystals may be removed either prior to or during the decomposition of the aluminum sulfate crystals. The decomposition is carried out at a temperature below 1000° C. and in such a manner that it is started under reducing conditions and completed under oxidizing conditions so as to prevent according to the present invention the formation of basic sulfates which can only difficultly or not at all be separated from the alumina. In this manner the decomposition process can be so carried out that upon decomposition of the sulfate substantially only $SO_2$ and $SO_3$ and no $O_2$ is formed. The nearly pure $SO_2$ leaving the decomposition apparatus can be further processed in simple and conventional manner to form the sulfuric acid required for decomposition of further portions of the raw material.

The solid residue remaining upon acidic decomposition of the raw material is separated from the aluminum sulfate-containing solution, for instance by means of rotary filters, and is washed out. Thereby a cake is obtained which contains about between 35 and 40% of water most of which is to be removed in order to transform the silicic acid of the residue into a state in which the same will have great binding ability and will be highly reactive for instance with lime. This is achieved by roasting the residue at temperatures of between 150 and 300° C., and sometimes at higher temperatures, the specific optimum roasting temperature depending on the quality and chemical composition of the residue.

In this manner, according to the present invention, high purity alumina is obtained fully complying with the requirements of the aluminum industry, and also a high grade building material binder which can serve as a valuable additive to lime, cement, cellular concrete, lightweight building elements of all kinds, and which can also serve together with filter ash as mortar or mortar-forming constituent.

Referring now to the individual steps as illustrated in the flow sheet, the present invention contemplates as raw material alumina and silicic acid containing minerals such as clays or bauxite, and the present method is particularly advantageous with respect to raw materials containing a relatively high percentage of silicic acid. The following analyses of two raw materials which may be processed according to the present invention are given as illustrative only, the present invention, however, not being limited to the specific analyses.

|  | Clay, percent | High SiO₂ Bauxite, percent |
|---|---|---|
| Al₂O₃ | 29.50 | 55 |
| TiO₂ | 0.81 | 3 |
| Fe₂O₃ | 1.73 | 5 |
| SiO₂ | 55.61 | 25 |

In the case of alumina silicates as raw materials, it is desirable that the alumina content is at least 25%. A high percentage of silicic acid, even exceeding 60%, does not interfere with the method of the present invention, and also does not make the same uneconomical, due to the conversion of the silicic acid-containing residue into a building material binder.

The raw material is preferably crushed to a size of between 10 and 12 millimeters. It is also possible to roast larger particles such as nut-sized particles, however, the roasting time increases with increasing particle sizes.

Preferably, the roasting is carried out at a temperature of between 680 and 780° C. The optimum temperature for each raw material, i.e. the roasting temperature which will transform the raw material into a state in which about 70% of the entire alumina content of the raw material are soluble in diluted sulfuric acid, should be determined in a laboratory test of the specific batch of raw material. Upon determination of the optimum temperature, the roasting time has to be so adjusted that the raw material particles are roasted throughout, i.e. upon crushing of a roasted particle the same must appear roasted throughout. Incomplete roasting manifests itself usually in the dark color of the inner, incompletely roasted portion of the particle.

In order to determine the optimum roasting temperature for a given raw material, samples of the same are roasted in small laboratory muffle furnaces at varying temperatures between about 680° C. and 780° C. for a period of two hours. The roasted samples are then ground and decomposed with an equal amount of diluted sulfuric acid. Thereafter the percentage of alumina which has been dissolved is determined. At optimum roasting temperature this percentage will be about 70%. A lower percentage indicates that the roasting temperature was either too high or too low. If the roasting temperature was too low, the splitting off of silicic acid has not been completed, if the roasting temperature was too high, the silicic acid has been changed into an acid-insoluble state. For this reason, the optimum roasting temperature is also referred to as the threshold value.

The roasting is preferably carried out in countercurrent direction to the flow of heat, i.e., the material to be roasted is moved towards the roasting flame so that the moisture which originally usually amounts to about between 9 and 15% can quickly escape. The entire roasting process should take about two hours to achieve complete roasting of the particles, including the center portion thereof.

The roasting is preferably carried out in a furnace with several beds, for instance five beds whereby heat is supplied to the third and fifth bed. In this case, the temperatures will increase from the first bed to the fifth bed.

The roasted material is finely crushed, for instance in a pebble mill, to a particle size preferably not exceeding 4 millimeters. It is desirable that all of the particles leaving the pebble mill are of substantially equal size.

The thus roasted and comminuted raw material is then treated with diluted sulfuric acid, preferably with a quantity of sulfuric acid which is slightly less than the quantity required for dissolution of all of the soluble alumina. By operating with less than the theoretically required quantity of sulfuric acid, dissolution of impurities such as iron sulfate is prevented to a considerable extent. Furthermore, precipitation of the portion of the impurities which has been dissolved by the diluted sulfuric acid, upon subsequent stirring of the mixture is favorably influenced by a smaller relative quantity of sulfuric acid. In the presence of undissolved alumina in such state that the same would have been dissolved in excess sulfuric acid, originally dissolved iron sulfate is again precipitated. Preferably, sulfuric acid treatment is carried out at elevated temperatures such as about 95° C. It is also within the scope of the present invention to carry out the sulfuric acid treatment and consequently the decomposition of the roasted raw material in countercurrent flow and/or at superatmospheric pressure. When further treatment of the residue and recovery of the same as a building material binder is not desired, it is also possible to treat roasted particles with sulfuric acid without first reducing the size of the particles to 4 millimeters or less. In this case, the acid treatment may be carried out for instance with particle sizes of between 5 and 30 millimeters.

It is sometimes desirable to conclude the sulfuric acid treatment with an oxidative treatment in order to precipitate dissolved impurities. This can be done by aerating the mixture obtained in the sulfuric acid treatment during the stirring period. Or, it is also possible to add to the mixture during the stirring of the same a small quantity of an oxidizing salt, for instance about 1% of manganese dioxide. Thereby ferrous sulfate is oxidized to ferric sulfate and precipitates as such.

The thus-obtained solution of aluminum sulfate is separated, preferably by means of a rotary filter, from the solid residue, and the thus-obtained clear solution is then subjected to interrupted vacuum crystallization.

For this purpose, sulfuric acid is added to the alkaline aluminum sulfate solution until the solution is neutralized and the neutral solution is filled into a vacuum evaporator so as to about half fill the vacuum cooker or evaporator. Thereafter a partial vacuum of between about 30 and 160 millimeters mercury is produced and the solution is heated to boiling. Thereby the temperature rises from room temperature or about 30° C. to about 70° C. Boiling is continued under stirring for about one hour, until crystal formation starts. Crystal formation can be recognized by the sudden change in color from a clear green solution to a cloudy whitish color. Upon observing this cloudiness, the crystallization process is interrupted by the sudden addition of either water, or additional aluminum sulfate solution, or mother liquor (which will be described further below). The quantity of liquid introduced at this point into the evaporator amounts to about between one-third and one-fifth of the total quantity of liquid which will now be in the evaporator. Thereby, a temperature drop of between about 20 and 30° C. is achieved. At about 50° C. crystallization is then continued under vacuum until the crystals have grown to a size sufficiently big to allow centrifugal separation from the mother liquor. This requires about two to three hours. Thereafter, a portion of the thus-formed crystal mass is withdrawn, atmospheric pressure is restored in the evaporator, and additional aluminum sulfate solution is introduced into the evaporator. Thereby a temperature of about 50° C. is maintained in order to prevent contamination of the crystals with cooling and solidifying mother liquor. For the same reason, the centrifuge in which the crystals are separated from the mother liquor should be heatable so that the temperature therein can be maintained at about 50° C.

After separating the crystals from the mother liquor in the centrifuge, the crystals are washed with a small quantity of sold water prior to being removed from the centrifuge.

In this manner, the crystallization process can be continued indefinitely by from time to time withdrawing a portion of the crystal mass and adding fresh solution to the portion of the crystal mass remaining in the evaporator. The crystal mass, as long as in contact with mother liquor, is preferably maintained at a temperature of between about 45° C. and 54° C., and, as stated above, most preferably at a temperature of about 50° C.

In this manner, and by proper operation of the centrifuge it is possible to obtain aluminum sulfate crystals having an aluminum content corresponding to 15.3% $Al_2O_3$ and an iron content corresponding to only about 0.003% $Fe_2O_3$, while the iron content of the aluminum sulfate solution entering the evaporator usually corresponds to about 0.2% $Fe_2O_3$. Accordingly, recrystallization of the thus-obtained aluminum sulfate crystals is usually not necessary. However, when for some reason, such as an improperly operating centrifuge, aluminum sulfate crystals of less than the desired purity are obtained, the crystals can be dissolved in as small a quantity of water as possible and recrystallized therefrom in the manner described above.

The mother liquor from the centrifuge can, depending on general operating conditions and the purity of the mother liquor, be either returned to the evaporator, or, after dilution with water, be added in the sulfuric acid decomposition step.

The 18 mols of water of crystallization contained in the crystallized aluminum sulfate are preferably driven off at a temperature of between 150 and 200° C., prior to decomposition of the aluminum sulfate.

Decomposition of the aluminum sulfate from which preferably (but not necessarily) the water of crystallization has been driven off, is carried out in a rotary furnace, the shell of which is provided with a plurality of gas burners which can be adjusted so as to control the temperature in the furnace and also so as to emanate a reducing or oxidizing flame, as desired. The temperature during decomposition of the aluminum sulfate crystals is preferably maintained at between 750° C. and 850° C., and in any event should be below 1000° C. The flames of the furnace are first so adjusted that there is a slight excess of reducing gas which will bind oxygen which is freed from the decomposing aluminum sulfate in a form other than $SO_2$ or $SO_3$. Only towards the end of the decomposition process, the flames of the burners are changed to oxidizing flames. In this manner, it is achieved that the gases leaving the furnace are either free of oxygen or contain only a few tenths of 1% of oxygen while containing about 6% of $SO_2$ and $SO_3$. Condensed sulfuric acid is only detectable in traces. Thus, the gases leaving the rotary furnace can be converted in conventional manner into pure sulfuric acid of 60°.

As stated further above, the solid residue of the sulfuric acid leaching or decomposition step is separated from the aluminum sulfate-containing solution by means of a rotary filter. The thus-obtained residue contains about 40% water and is heated in a rotary furnace or in another suitable drying apparatus to a temperature of between about 130° and 300° C., whereby the water is partially driven off and the silicic acid of the residue is activated so as to become reactive with respect to lime, cement or the like so that in a mixture of the thus-treated residue with cement and water a calcium hydrosilicate will be formed. By heating the residue to a temperature of between about 130 and 300° C., a sufficiently large portion of the water contained therein must be driven off so that the final product, after being dried for four hours at 110° C. will contain only about between 8 and 10% water. Since the thus-obtained product is hygroscopic, it has to be protected against atmospheric moisture, and it is therefore preferably packaged in a manner similar to the packaging of cement, i.e. after cooling and grinding in a pebble mill, it is packed in suitable bags or transported in closed tank cars. The thus-obtained building material binder has a composition of about 63–65% $SiO_2$, 12–14% $Al_2O_3$, 2.5–3.5% $Fe_2O_3$ and $TiO_2$, and up to 3% of alkali and alkaline earth.

The following examples are given as illustrative only of the method of the present invention, the invention, however, not being limited to the specific details of the examples.

Example I

A bauxite containing about 55% alumina and about 25% silicic acid is reduced to a particle size of between 10 and 12 mm. Samples of the thus crushed bauxite are tested in the laboratory as described above in order to determine the threshold value or optimum roasting temperature.

In this manner a threshold value of 710° C. is found. The crushed bauxite is then roasted in a five-bed furnace in such a manner that the bauxite is slowly moved from the first bed to the fifth bed of the furnace. The temperature of the first bed is maintained at 430° C., of the second bed at 550° C., of the third bed at 610° C., of the fourth bed at 590° C. and of the fifth bed at 710° C. The shaft of the agitator, the arms of which move the roasting material turns at slow speed so as to complete one revolution in about 82 seconds. About 120 kg. of bauxite per hour are introduced into the furnace, and the time required for the bauxite to pass through the furnace is two hours. The bauxite leaving the furnace is roasted throughout as can be easily seen by further crushing a roasted bauxite particle and inspecting the color of the inner portions thereof.

Thereafter, the roasted bauxite is comminuted in a pebble mill to a particle size of about 3 mm.

The leaching out of the alumina in the form of aluminum sulfate is carried out with somewhat less than the amount of diluted sulphuric acid which would be required to transform all of the soluble alumina into aluminum sulfate. The leaching process can be carried out continuously or intermittently. In the first case, the acid is preferably conducted in countercurrent flow to the roasted particles. The countercurrent leaching can be carried out at normal or superatmospheric pressure. Several leaching vessels may be used in order to vary the concentration of leached material in the sulphuric acid.

According to the present example, diluted sulphuric acid is heated with direct steam to a temperature of 95° C. in an open reaction vessel and thereafter the comminuted roasted bauxite is introduced into the hot acid. Under stirring of the thus-formed mixture, a rather violent reaction takes place. The quantitative relationships are so chosen that about 100 grams of roasted bauxite are reacted with each 350 cc. of sulphuric acid containing 260 grams of $H_2SO_4$ per liter. After completion of the leaching reaction or acid decomposition of the roasted bauxite, the entire mixture, including the insoluble residue is passed into another vessel equipped with an agitator and is stirred therein for 36 hours. The thus-formed aluminum sulfate solution will contain about the equivalent of 100 grams of alumina and 0.6 gram $Fe_2O_3$ per liter. About 71% of the alumina contents of the raw material are dissolved in this manner.

Prior to separating the thus-formed solution from the residue, a small quantity of manganese dioxide, approximately 1 gram per liter of solution, is stirred into the mixture in order to oxidize and thereby precipitate dissolved impurities.

Thereafter, the aluminum sulfate containing solution is separated from the solid residue by means of conventional rotary filters or filter presses. The thus-obtained clear solution is then introduced into a vacuum evaporator for crystallization of the aluminum sulfate.

The solution is introduced into the vacuum pan so as to fill about half of the usable space thereof, and is brought to boiling under a pressure of about 100 mm. mercury. Boiling continues under stirring for about one hour, after which time crystal formation starts and is recognizable by the change of the color of the solution from green to a whitish color. At this stage a quantity amounting to about ⅓ of the usable volume of the vacuum pan of additional aluminum sulfate solution and/or mother liquor from the subsequent separation of aluminum sulfate crystals, is added. Thereby crystallization and boiling is interrupted due to change (i.e. reduction) of concentration and temperature. Upon further evaporation under stirring at a pressure of about 160 mm. and a corresponding temperature of between 50 and 54° C., the crystals continue to grow until a sufficiently heavy crystal mass is formed to be separated by centrifugation. The crystal mass, or a portion thereof if the evaporator is to operate continuously, is then passed into an intermediary container in which normal pressure is restored in a not too sudden and controlled manner. Thereafter, the crystal mass is passed into a heated centrifuge and therein is separated from the mother liquor. It is essential that until the mother liquor is removed, the temperature is kept sufficiently high to prevent solidification of the mother liquor or any portion thereof. The mother liquor which contains considerable quantities of dissolved aluminum sulfate is then recycled either to the evaporator or to the vessel in which the leaching of the roasted raw material with sulphuric acid takes place. The crystals of aluminum sulfate are washed, while still in the centrifuge, with a small quantity of cold water, and in this manner aluminum sulfate crystals of high purity containing only the equivalent of between 0.003% and 0.005% $Fe_2O_3$ and the like, are obtained.

It is usually not necessary, but of course possible if desired, to further increase the purity by re-crystallization.

The thus obtained aluminum sulfate crystals are then dried to remove water of crystallization and decomposed in a rotary furnace provided with adjustable gas burners so that decomposition can be nearly completed under reducing conditions, while in the final stage of decomposition the burners are so adjusted as to provide an oxidizing flame. This decomposition process under formation of alumina and sulfur dioxide (and trioxide) is carried out at a temperature of about 800° C., as fully described in the paragraphs preceding this example. The thus obtained aluminum oxide is free of sulfuric acid remnants and can be processed electrolytically in customary manner to aluminum.

The sulfur containing gases are processed in a tower system to sulfuric acid. Preferably a simplified lead chamber system is employed, whereby the gases are absorbed in liquids while passing through reaction towers containing chamotte stones, and whereby the gases come in contact with nitrous acid.

The solid residue obtained by removal of the aluminum sulfate-containing solution from the remainder of the raw material, is washed in the filter presses or on the rotary filter and then further processed to a building material binder, as fully described in the paragraphs preceding this example.

A clay-tpe raw material can be processed substantially in the same manner as described above, taking into consideration the quantitative differences with respect to the percentage of alumina in the raw material.

*Example II*

It is also possible, when using bauxite as raw material, to first crush the bauxite, and to leach the crushed bauxite with hot acid in order to remove the larger portion of the iron oxide in the form of iron sulfate, while the alumina remains substantially undissolved.

The solid residue obtained thereby is then roasted, further reduced in size and further treated as described in Example I.

*Example III*

The sulfuric acid leaching of the roasted raw material described in Example I can also be modified by omitting the further reducing in size of the roasted particles which according to Example I have a size between 10 and 12 mm., and by leaching these larger roasted particles with less than the theoretically required amount of diluted sulfuric acid in the form of solutions of increasing concentration. Thereby it is also possible to carry out the leaching under super-atmospheric pressure.

*Example IV*

When it is desired to remove traces of impurities from the alumina produced according to Example I, the alumina is ground in a wet mill with a mineral acid of low concentration such as hydrochloric acid, nitric acid or sulfuric acid in a concentration of between 1 and 5%. If lime is to be removed, it is advisable to first grind the alumina with a 15% aqueous sodium chloride solution prior to reacting with acid. The liquids used in this purification process can be reused several times and, if desired, can then be reintroduced into the acid leaching step described in Example I.

*Example V*

The processing of the sulfur dioxide and trioxide obtained by decomposition of the aluminum sulfate crystals as described in Example I can be controlled and supplemented by the addition of sulfur powder in such a manner that the sulfur powder is blown through nozzles into the sulfur dioxide containing gas stream flowing towards the sulfuric acid plant.

*Example VI*

The building material binder produced according to the present invention can be made more effective by adding thereto small quantities of calcium or barium compounds. These compounds may either be ground together with the binder material, or may be mixed with the heated binder material, preferably in quantities equivalent to the silicic acid content of the binder material under addition of small quantities of liquid.

*Example VII*

The building material binder produced according to the present invention may also be mixed with filler materials, fibrous materials, etc. so as to form a plastic mass which may be formed either on an extrusion press or by shaking motion and which then may be hydrothermically hardened, either alone or with metal reinforcements.

*Example VIII*

The building material binder produced according to the present invention can be added in quantities of about between 20 and 35% to lime in order to form hydraulic lime.

The material may also be added to cement in small quantities in order to improve the quality of the same, since the reactive silicic acid of the material binds the remnants of free lime which are still present after setting of the cement.

The material may also be added to brown coal filter ash in order to adapt the latter for use as mortar.

The material may also be added to gypsum-slag cement in order to prevent shrinking of the same.

Thus, according to the present invention it is possible to completely process alumina and silicic acid-containing raw materials, using sulfuric acid as decomposition agent. On the one hand, it is possible according to the present invention to leach the alumina from the raw material in the form of aluminum sulfate, to obtain aluminum sulfate crystals of very high purity and to decompose the same so as to obtain practically absolutely pure aluminum oxide. On the other hand it is possible to transform the acid-insoluble residue of the raw material according to the present invention by treatment at elevated temperatures into a building material of high binding ability. It is important also that the gases obtained by decomposition of the aluminum sulfate according to the present invention at a temperature below 1,000° C. can be reprocessed to sulfuric acid, which sulfuric acid may then be used for leaching of roasted raw material, so that the same quantity of sulfuric acid can be re-cycled through the process of the present invention substantially without losses and consequently substantially without requiring the introduction of additional quantities of sulfuric acid. Thus the present invention provides a method for processing in an acidic process silicic acid-containing alumina compounds in a manner which is technically and economically superior to alkaline processes for the same purpose, whereby, according to the present invention, the particular advantages are obtained that it is now also possible to process raw materials which do not lend themselves to alkaline decomposition, and that the entire raw material is transformed into useful products.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of converting a raw material containing alumina and silicic acid into alumina of high purity and into a silicic acid-containing product capable of forming with lime and water a calcium hydrosilicate, comprising the steps of evenly roasting said raw material at a temperature and for a period of time sufficient to transform a major portion and up to about 70% of the alumina in said raw material into a state in which said portion is soluble in diluted sulfuric acid so that more than half and up to about 70% of the alumina in the thus roasted raw material is soluble in diluted sulfuric acid; treating the thus roasted raw material with diluted sulfuric acid so as to convert said raw material into a solution of aluminum sulfate in said sulfuric acid and into a solid residue containing silicic acid and a portion of the alumina of said raw material; separating said solid residue from said aluminum sulfate solution; heating said solid residue at a temperature of between about 130° C. and 300° C. so as to transform the larger portion of the silicic acid therein into a state wherein said silicic acid is capable of forming with lime and water a calcium hydrosilicate; and converting said dissolved aluminum sulfate into alumina whereby alumina of high purity suitable for electrolytic production of aluminium is obtained and whereby substantially all of the alumina and silicic acid contained in said raw material are converted into high purity alumina, and into a silicic acid and alumina-containing, binder-type building material additive.

2. A method of converting a raw material containing alumina and silicic acid and selected from the group consisting of bauxite and clay into alumina of high purity and into a silicic acid-containing product capable of forming with lime and water a calcium hydrosilicate, comprising the steps of evenly roasting said raw material at a temperature and for a period of time sufficient to transform about 70% of the alumina in said raw material into a state in which the same is soluble in diluted sulfuric acid; treating the thus roasted raw material with diluted sulfuric acid so as to convert said raw material into a solution of aluminum sulfate in said sulfuric acid and into a solid residue containing silicic acid and a portion of the alumina of said raw material; separating said solid residue from said aluminum sulfate solution; heating said solid residue at a temperature of between about 130° C. and 300° C. so as to transform the larger portion of the silicic acid therein into a state wherein said silicic acid is capable of forming with lime and water a calcium hydrosilicate; and converting said dissolved aluminum sulfate into alumina so as to obtain alumina of high purity suitable for electrolytic production of aluminum, whereby substantially all of the alumina and silicic acid contained in said raw material are converted into high purity alumina, and into a silicic acid and alumina-containing, binder-type building material additive.

3. A method of converting a raw material containing alumina and silicic acid into alumina of high purity and into a silicic acid-containing product capable of forming with lime and water a calcium hydrosilicate, comprising the steps of evenly roasting said raw material at a temperature and for a period of time sufficient to transform a major portion of more than half and up to about 70% of the alumina in said raw material into a state in which said portion is soluble in diluted sulfuric acid; treating the thus roasted raw material with diluted sulfuric acid so as to transform said raw material into a solution of aluminum sulfate in said sulfuric acid and into a solid residue containing silicic acid and a portion of the alumina of said raw material; separating said solid residue from said aluminum sulfate solution; heating said separated solid residue at a temperature of between about 130° C. and 300° C. so as to transform the larger portion of the silicic acid in said residue into a state wherein said silicic acid is capable of forming with lime and water a hydrosilicate; subjecting in an evaporator said aluminum sulfate solution to partial evaporation under vacuum until aluminum sulfate crystal formation starts; introducing an additional quantity of aluminum sulfate solution having a concentration below the saturation point of the aluminum sulfate contained therein into said evaporator so as to interrupt aluminum sulfate crystal formation therein; continuing to subject the aluminum sulfate solution in said evaporator to partial evaporation under vacuum until crystal formation is resumed and the thus formed crystals of aluminum sulfate have grown to a size adapted to be separated from the mother liquor by centrifuging, so as to obtain a mixture of water of crystallization-containing aluminum sulfate crystals of high purity and mother liquor; centrifuging said mixture so as to separate said aluminum sulfate crystals from said mother liquor; heating said aluminum sulfate crystals at a temperature of between 150° C. and 200° C., so as to substantially completely remove water of crystallization therefrom; further heating in a rotary furnace the thus treated aluminum sulfate crystals at a temperature of between about 750° and 850° C. and under reducing conditions so as to decompose at least the major portion of said aluminum sulfate crystals into sulfur dioxide and aluminum; and continuing said heating under oxidizing conditions for a relatively short period of time and until substantially all of said aluminum sulfate crystals have been decomposed into sulfur dioxide and alumina, said oxidizing conditions being so adjusted that the sulfur dioxide-containing gases leaving said furnace have a free oxygen content of less than 1%, whereby substantially all of the alumina and silicic acid contained in said raw material are converted into high purity alumina, and into a silicic acid and alumina-containing, binder-type building material additive and in addition sulfur dioxide suitable for reconversion into sulfuric acid is obtained.

4. A method of converting a raw material containing alumina and silicic acid into alumina of high purity and into a silicic acid-containing product capable of forming with lime and water a calcium hydrosilicate, comprising the steps of evenly roasting said raw material at a temperature of between about 680° C. and 780° C. and for a period of time sufficient to roast said raw material throughout and to transform a major portion and up to about 70% of the alumina in said raw material into a state in which said portion is soluble in diluted sulfuric acid so that more than half and up to about 70% of the alumina in the thus roasted raw material is soluble in diluted sulfuric acid; treating the thus roasted raw material with diluted sulfuric acid so as to convert said raw material into a solution of aluminum sulfate in said sulfuric acid and into a solid residue containing silicic acid and a portion of said alumina of said raw material; separating said solid residue from said aluminum sulfate solution; heating said solid residue at a temperature of between about 130° C. and 300° C. so as to transform the larger portion of the silicic acid therein into a state wherein said silicic acid is capable of forming with lime and water a calcum hydrosilicate; and converting said dissolved aluminum sulfate into alumina so as to obtain alumina of high purity suitable for electrolytic production of aluminum, whereby substantially all of the alumina and silicic acid contained in said raw material are converted into high purity alumina, and into a silicic acid and alumina-containing, binder-type building material additive.

5. A method of converting a raw material containing alumina and silicic acid into alumina of high purity and into a silicic acid-containing product capable of forming with lime and water a calcium hydrosilicate, comprising the steps of evenly roasting said raw material in countercurrent flow with a hot gas at a temperature of between about 680° C. and 780° C. and for a period of about two hours so as to roast said raw material throughout and to transform a major portion and up to about 70% of the alumina in said raw material into a state in which said portion is soluble in diluted sulfuric acid so that more than half and up to about 70% of the alumina in the thus roasted raw material is soluble in diluted sulfuric acid; treating the thus roasted raw material with diluted sulfuric acid so as to convert said raw material into a solution of aluminum sulfate in said sulfuric acid and into a solid residue containing silicic acid and a portion of the alumina of said raw material; separating said solid residue from said aluminum sulfate solution; heating said solid residue at a temperature of between about 130° C. and 300° C. so as to transform the larger portion of the silicic acid therein into a state wherein said silicic acid is capable of forming with lime and water a calcium hydrosilicate; and converting said dissolved aluminum sulfate into alumina so as to obtain alumina of high purity suitable for electrolytic production of aluminum, whereby substantially all of the alumina and silicic acid contained in said raw material are converted into high purity alumina, and into a silicic acid and alumina-containing, binder-type building material additive.

6. A method as defined in claim 3, wherein said mother liquor obtained by centrifuging the crystals of aluminum sulfate-containing mixture is at least partly re-introduced in the step of treating subsequent portions of roasted raw material with diluted sulfuric acid.

7. A method as defined in claim 3, wherein said mother liquor obtained by centrifuging the crystals of aluminum sulfate-containing mixture is at least partly reintroduced together with subsequent portions of said aluminum sulfate solution into said evaporator for being subjected therein to partial evaporation.

8. A method as defined in claim 3, wherein said mother liquor obtained by centrifuging the crystals of aluminum sulfate-containing mixture is in part introduced in the step of treating subsequent portions of roasted raw material with diluted sulfuric acid and the remainder of said mother liquor is introduced together with subsequent portions of said aluminum sulfate solution into said evaporator for being subjected therein to partial evaporation.

References Cited in the file of this patent

UNITED STATES PATENTS

| | | |
|---|---|---|
| 2,189,376 | Burman | Feb. 6, 1940 |
| 2,230,592 | Griessbach et al. | Feb. 4, 1941 |
| 2,323,499 | Wilson | July 6, 1943 |
| 2,381,477 | Walthall | Aug. 7, 1945 |
| 2,402,471 | Tuwiner | June 18, 1946 |
| 2,438,488 | Anderson et al. | Mar. 30, 1948 |
| 2,833,621 | Reeve | May 6, 1958 |